United States Patent
Franz et al.

(10) Patent No.: US 8,733,843 B2
(45) Date of Patent: May 27, 2014

(54) PROCESS FOR PRODUCING A SUPPORTING SHELL FOR A SEAT

(75) Inventors: Matthias Franz, Brannenburg (DE); Alexander Durt, Inning am Ammersee (DE); Uemit Kilincsoy, Munich (DE); Peter Vink, Le Rijnsburg (NL)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 191 days.

(21) Appl. No.: 13/186,220

(22) Filed: Jul. 19, 2011

(65) Prior Publication Data
US 2011/0272979 A1    Nov. 10, 2011

Related U.S. Application Data

(63) Continuation of application No. PCT/EP2010/002075, filed on Mar. 31, 2010.

(30) Foreign Application Priority Data

Apr. 2, 2009    (DE) .......................... 10 2009 016 051

(51) Int. Cl.
*A47C 7/00* (2006.01)
*G01L 1/22* (2006.01)
*G01L 3/00* (2006.01)

(52) U.S. Cl.
USPC ................... 297/452.28; 297/452.5; 702/139; 73/862.046

(58) Field of Classification Search
USPC ......... 73/862.625, 862.041–862.046, 862.07, 73/862.381, 862.581, 862.621, 862.629, 73/862.632, 862.636, 862.637; 297/452.28
See application file for complete search history.

(56) References Cited

U.S. PATENT DOCUMENTS

| 2,847,061 A | 8/1958 | Morton |
| 3,081,129 A | 3/1963 | Ridder |

(Continued)

FOREIGN PATENT DOCUMENTS

| DE | 72 01 645 U | 4/1972 |
| DE | 40 01 100 A1 | 7/1991 |

(Continued)

OTHER PUBLICATIONS

German Search Report dated May 5, 2010 with partial English translation (nine (9) pages).

(Continued)

*Primary Examiner* — Lisa Caputo
*Assistant Examiner* — Jonathan Dunlap
(74) *Attorney, Agent, or Firm* — Crowell & Moring LLP

(57) ABSTRACT

A supporting shell for a seat is provided by carrying out in-seat measurements with a plurality of test subjects, wherein the test subjects sit down on a measuring mat placed on a neutral seat frame. The measuring mat has a readily displaceable filling and adapts to the contour of the body of the respective test subject. After the test subject has sat down on the measuring mat and before the test subject leaves the same, the filling inside the measuring mat is fixed in place by applying a negative pressure. The geometric data of the surface contour of the measuring mat are determined and stored for each test subject. The measured surface contours are then superimposed onto one another. This produces an average surface contour which can subsequently be further altered slightly for adaptation to large seat users, and therefore a modified surface contour is created as a basis for the production of the supporting shell of the seat.

20 Claims, 4 Drawing Sheets

(56) References Cited

U.S. PATENT DOCUMENTS

| | | | |
|---|---|---|---|
| 4,514,010 A * | 4/1985 | Sabater Gonzalez | 297/284.1 |
| 4,634,179 A * | 1/1987 | Hashimoto et al. | 297/284.6 |
| 4,846,917 A * | 7/1989 | Hartel et al. | 156/286 |
| 4,852,945 A | 8/1989 | Rowles et al. | |
| 4,972,351 A | 11/1990 | Reger et al. | |
| 5,029,939 A * | 7/1991 | Smith et al. | 297/284.1 |
| 5,556,169 A * | 9/1996 | Parrish et al. | 297/452.28 |
| 5,587,933 A * | 12/1996 | Gross | 702/139 |
| 5,595,806 A * | 1/1997 | Korfmacher | 428/69 |
| 5,747,676 A | 5/1998 | Faust et al. | |
| 5,877,436 A | 3/1999 | Faust et al. | |
| 6,223,606 B1 * | 5/2001 | Burke et al. | 73/862.041 |
| 6,713,001 B1 | 3/2004 | Cannon et al. | |
| 6,966,233 B2 * | 11/2005 | Brown | 73/862.581 |
| 7,234,183 B2 * | 6/2007 | Elrod et al. | 5/699 |
| 7,237,443 B2 * | 7/2007 | Speckhart et al. | 73/862.046 |
| 7,254,853 B1 * | 8/2007 | Kim | 5/712 |
| 7,549,232 B2 * | 6/2009 | Tadin | 33/515 |
| 7,567,184 B2 * | 7/2009 | Betz et al. | 340/667 |
| 2005/0242650 A1 * | 11/2005 | Reynolds et al. | 297/452.5 |
| 2006/0150756 A1 | 7/2006 | Kassing et al. | |
| 2008/0204211 A1 * | 8/2008 | Betz et al. | 340/438 |
| 2009/0107258 A1 * | 4/2009 | Saitoh et al. | 73/862.046 |

FOREIGN PATENT DOCUMENTS

| | | |
|---|---|---|
| DE | 196 01 972 C2 | 7/1997 |
| DE | 196 01 974 A1 | 7/1997 |
| DE | 695 05 131 T2 | 6/1999 |
| DE | 199 10 427 A1 | 9/2000 |
| DE | 102 40 462 A1 | 6/2003 |
| DE | 102 55 445 A1 | 6/2004 |
| DE | 10 2004 013 674 A1 | 10/2005 |
| DE | 10 2006 032 891 A1 | 1/2008 |
| WO | WO 99/33380 A1 | 7/1999 |

OTHER PUBLICATIONS

International Search Report dated Aug. 13, 2010 with English translation (six (6) pages).

* cited by examiner

PROCESS FOR PRODUCING A SUPPORTING SHELL FOR A SEAT

CROSS-REFERENCE TO RELATED APPLICATIONS

This application is a continuation of PCT International Application No. PCT/EP2010/002075, filed Mar. 31, 2010, which claims priority under 35 U.S.C. §119 from German Patent Application No. DE 10 2009 016 051.5, filed Apr. 2, 2009, the entire disclosures of which are herein expressly incorporated by reference.

This application contains subject matter related to U.S. application Ser. No. 13/186,240 (issued as U.S. Pat. No. 8,424,967) entitled "Cushion for a Seat and Method of Adapting Same," filed on even date herewith, the disclosure of which is herein expressly incorporated by reference.

BACKGROUND AND SUMMARY OF THE INVENTION

The invention relates to a process for producing a supporting shell for a seat and a process for producing a cushion support for a seat.

Seats known in the prior art are substantially composed of a supporting structure for the seating surface and the backrest that are each provided with cushion supports. Seats such as office chairs or seats in motor vehicles exhibit adjustability so that the seat can adapt to the respective seat user. Thus, for example, the inclination of the seating surface and/or the backrest can be adjusted. Additional adjusting devices disposed particularly in the backrest, for example, a backrest width-adjuster, a lumbar support, a horizontally extending bending axis, etc. are known in the prior art. These known adjusting devices are intended to enable the best possible adaptation of the seat to the respective seat user.

In principle, maximum seating comfort is achieved when the contour of the seating surface and/or the backrest of the seat agree extensively with the physiological form of the seat user.

However, the contour of seats known in the prior art corresponds only to a limited extent to the body form of the different possible seat users while allowing for the freedom of movement that is desired (and required for performing the task of driving, in the case of a seat for a motor vehicle). In order to still achieve good contact comfort, the region of the seating surface and/or backrest of seats known in the prior art are provided with cushion supports that have relatively thick foam in order to compensate firstly for the incongruity between the contour of the seating surface and/or backrest and secondly the body of the seat user. These cushion supports require relatively large installation space due to the thickness of the cushion foam.

It is an object of the present invention to specify a process, which forms the prerequisite of being able to produce a seat that provides a high degree of seating comfort and requires less installation space.

This and other objects are achieved according to the invention by providing the supporting substructure of the seat with a shape that most closely approximates the body form of the plurality of possible seat users so that the supporting substructure, with its good fit, necessitates only a relatively thin cushion support in order to achieve good seating comfort. This supporting substructure is referred to hereinafter as a "supporting shell" in the context of the present invention.

According to an aspect of the invention, the cushion support of the seat is provided with a shape that most closely approximates the body form of the plurality of possible seat users so that the cushion support can be designed so as to be relatively thin due to its good fit. In doing this, very good seating comfort is achieved. Here, the supporting substructure of the seat can be approximately planar or it can have a three-dimensional contour.

In the process of the invention, a measuring mat is placed on a seat frame comprising planar and non-cushioned bearing surfaces for the seating surface and/or the backrest. The measuring mat is flexible in space and it has less inherent rigidity so that it can adapt to the body form of a test subject without any significant resistance under the action of the body weight (particularly on the seating surface) and the contact pressure (particularly on the backrest) of the test subject. A measuring mat of similar type is disclosed in DE 196 01 972 C2. The measuring mat disclosed therein is in the form of a hollow body which has flexible partition walls and the interior of which comprises, for example, a plurality of small spherical solid bodies that can be displaced relative to each other with little effort. The solid bodies can be fixed in place by the application of negative pressure so that a surface contour of the measuring mat produced by the test subject is "frozen." After the test subject has left the measuring mat, the surface contour produced by the test subject is retained due to the negative pressure applied. According to the invention, the surface contour produced on the measuring mat is detected, for example, by use of a multi-coordinate measuring device. The thus scanned data of the surface contour of the measuring mat are stored in a computer unit. This completes an in-seat measurement carried out with a test subject.

The seat frame for receiving the measuring mat can comprise a device for altering the angle between the backrest and the seating surface. Alternatively, the as-designed position of the seat can be reproduced by way of a seat frame, in which there exists a fixed angle between the backrest and the seating surface.

In the in-seat measurement, as mentioned above, the measuring mat is deformed as a result of the body weight and the static contact pressure of the test subject in the mere action of the test subject sitting down on the measuring mat. Depending on the type of seat, the in-seat measurement can be supplemented by a "dynamic component" in that the test subject performs the movements that are typical of a seat user and are reflective of the freedom of movement required by the seat user. In the case of a seat for a motor vehicle, these movements are the ones required to be carried out by a vehicle driver to perform the task of driving, for example, steering, accelerating, braking, etc.

The in-seat measurements are repeated with a plurality of test subjects of different heights, different weights and different physiques. As far as possible, the in-seat measurements cover the entire range extending from the so-called "5% woman" to the so-called "95% man." The surface contour of the measuring mat produced by every test subject is measured and stored in the computer unit.

On the conclusion of the in-seat measurements, the "measured surface contours" of all test subjects are superimposed onto each other and an "average surface contour" is computed.

The process of the invention differs fundamentally from the process disclosed in DE 196 01 972 C2. DE 196 01 972 C2 relates to a process for detecting the surface contour of an elastic seat cushion, said surface contour resulting under the action of a person seated on the cushion. In order to be able to detect the surface contour of the cushion, a measuring mat of much less layer thickness is used, which measuring mat practically does not alter the seating behavior and the contour of which reflects the surface contour of the elastically deformed cushion located thereunder.

By contrast, according to the invention, a set of surface contours is produced on a non-cushioned, planar seat frame by means of in-seat measurements carried out with different test subjects by the use of a measuring mat, the thickness of which is sufficient for the measuring mat to replace a cushion and to adapt completely to the contour of the seat user. The surface contours are superimposed onto each other to form an average surface contour that is used as a basis for designing a supporting structure that is intended for a seat and that includes the thinnest possible cushioning pad or as a basis for designing an accurately fitting cushion support.

The superimposition of the measured surface contours, referred to hereinafter as "scans," onto each other is substantially carried out in three steps.

In a first step, a section of the contact surface of the seat user with the seat, in which the scans are to be aligned to each other, is determined. Basically, any section of the contact surface is suitable for this purpose. However, those sections of the contact surface are particularly suitable, in which the geometric shape of the scans and the space coordinates of the scans deviate from each other to the least possible extent. As studies have shown, there are relatively large geometric similarities and relatively few deviations in the space coordinates in the region of the depression created by the buttocks (pelvic region) of the test subjects and the lower back section (lumbar region). The alignment of the scans to each other on the selected section means an alignment of the scans according to the conformities in the geometry of this selected section ("best-fit" process) and thus a displacement of the scans from their actual measured position in space into a common plane.

In the example of the region of the depression created by the buttocks of the test subject, this procedure means that the surface contour created by the "5%-woman" is displaced in the direction of the vertical axis of the seat to the "level" of the "95%-man" (or vice-versa) until both depressions created by the buttocks are located in one plane. Thus surface contours are offset exclusively based on their shapes, irrespective of their measured location in space, by means of an alignment of all scans according to this "best-fit" process, the remaining sections (e.g. the shoulder region) also being displaced together with the selected section (e.g. depression created by the buttocks).

In a second step, the thus aligned scans are averaged arithmetically. The "average surface contour" of all measured scans is computed by use of an averaging function known in CAD programs (for example, CATIA program). The basis for the averaging process is formed by the respective surface contours, which are measured in the form of point clouds and the individual points of which are provided by the CAD program with polygons in the form of triangular surfaces of every three adjacent points. A smooth surface is generated from this combination of triangular surfaces by way of a surface-creation function. The process of averaging individual measured surface contours is carried out by a computer and it preferably includes the entire contact surface between the seat user and the seat.

In the third and last step, the average surface contour is expanded slightly in at least one direction in space, thus resulting in a "modified surface contour." Taking the region of the depression created by the buttocks as an example, this means that the average surface contour is displaced at least in the transverse direction of the seat, that is, in the direction of the outer boundary line of the set of curves.

In the case of the production of a supporting shell, the displacement ("offset") is calculated by the thickness of the pad that is applied to that side of the supporting shell that is oriented toward the seat user. The thickness of the pad usually varies over the extent of the seating surface and/or backrest. The offset is necessary to enable the "95% man" to find sufficient space within the contour of the depression created by the buttocks subsequently on the supporting shell without the space available becoming "too narrow" for the "95% man." The pad on the supporting shell serves as a "comfort layer" and comprises a cushioning material, such as foam, as its essential component. The expansion of the average surface contour includes at least a considerable portion of the contact surface of the seat.

In the case of the production of a cushion support, the offset is dependent on different factors such as the foam hardness of the cushion support. Basically, the offset can also be dispensed with or it can turn out to be very small since the expansion of the average surface contour can already be achieved to a satisfactory extent by means of the resilience of the cushion support, if appropriate.

The expansion of the average surface contour shall not be understood to mean a uniform, linear "enlargement" of the average surface contour, but instead an offset in the direction of the upper percentile of all measured surface contours, it being possible for the offset along the seat to deviate more or less strongly from a linear and uniform enlargement. The extent of offset along the height and width of the measured surface contour is determined, for example, by an evaluator while allowing for anatomical and ergonomic criteria.

For example, the expansion at least in portions of the seat cushion and/or backrest can be carried out up to the extent of an "80% surface contour." Since the largest surface contours originate from very large and/or very corpulent test subjects, for whom conventional seats are also too narrow, an expansion of the average surface contour that exceeds the "80% extent" would impair the seating comfort for shorter and/or thinner seat users since these seat users would then find insufficient (lateral) support on the seat cushion and/or the backrest.

In principle, a compression of the average surface contour can also take place, at least in portions.

Unlike a seat shell that is individually adapted to a single seat user as is the case in racing cars, for example, the process of the invention naturally implies a compromise since the measured surface contours are "blurred" and distorted. Nevertheless, the supporting shell or cushion support thus produced according to the invention by means of a superimposition of the measured surface contours onto each other forms a surprisingly well-fitting surface of contact for all possible seat users with the seating surface and/or the backrest in spite of the differences in height, weight and physique of the test subjects.

In the preferred case where the depression created by the buttocks is used as the selected common section of the contact surface, this good fit can be explained, inter alia, by the differences in the shapes of the male pelvis and the female pelvis. The supporting shell produced according to the invention provides the good fit described above since the female pelvis is broader in relation to the male pelvis and the width of the depression created by the buttocks of a female test subject is within a relatively narrow range in spite of the height and weight of women being lesser on average than that of men.

Likewise, the lower section of the back that is adjacent to the depression created by the buttocks of the test subjects is suitable for use as the selected region for the superimposition of the measured surface contours onto each other.

In this preferred embodiment of the process of the invention with reference to the region of the depression created by the buttocks of the test subjects or the lower region of the back, the central and, more particularly, the upper region of the back is displaced in the vertical axis of the seat in the case of the plurality of test subjects. In the case of the production of a supporting shell, this can be easily compensated for by way of a lesser contouring of the supporting shell in the back region in conjunction with a thicker pad (cushioning layer). In the case of the production of a cushion support, the thickness of the cushion support is increased slightly in the back region. In both cases, a conventional lumbar support within the meaning of a bubble that can be activated separately and that has a variable volume is usually dispensed with since the height of such a lumbar support would not be suitable for all possible seat users.

Furthermore, the invention differs fundamentally from seats that are known in the prior art and that include recesses in the seat cushion, which recesses receive so-called "vacuum cushions" comprising pourable bulk material, as described in DE 199 10 427 A1 or DE 695 05 131 T2, for example. Also, seats having pockets which are placed thereon and comprise foam cushions having open-celled, self-inflating cushioning foam (DE 10 2004 013 674 A1) and seats that have cushions comprising a loose filling material and/or a fluid that can be redistributed by applying a magnetic or electric field, by applying an electric current, by heating or by hydraulic excitation (DE 10 2006 032 891 A1) are far from the present invention.

In an advantageous embodiment of the invention, the supporting shell or the cushion support serve for producing a seat for a vehicle. Accordingly, the series of measurements is carried out with test subjects that sit down in a posture corresponding to the sitting posture in the vehicle, for which the seat is intended. As mentioned above, the test subjects, when seated, preferably carry out movements required for performing the task of driving or other movements typical of the operation of the vehicle.

The CAD data set of the supporting shell or the cushion support can be used in CAD programs when designing a vehicle seat.

Seats that are produced using a supporting shell produced according to the process of the invention can be provided with a very thin cushioning pad; yet they still offer very good seating comfort since the pad, due to the good fit of the supporting shell, is only required to compensate for small "deviations" in the shape of the supporting shell from the body form of the seat user. This results in less installation space and low weight of the seat.

In an advantageous embodiment of the invention, the pad is in the form of a fluid-tight jacket having a spacer structure disposed in the interior of the jacket. The spacer structure is composed of layers of fabric that extend parallel to each other and are joined together by spacer threads. The jacket includes a hose line or a connection for a hose line in order to be able to control the amount of fluid inside the jacket. Such a pad is described in co-pending application Ser. No. 13/186,240 (issued as U.S. Pat. No. 8,424,967) entitled "Cushion for a Seat and Method of Adapting Same," filed on even date herewith, the disclosure of which is herein expressly incorporated by reference.

As is known from the prior art cited above, a delivery device can additionally be provided, by which the pad can be introduced into the pad or removed from the pad entirely or in part. The fluid can be a liquid or a gaseous substance.

Preferably, an adjusting device is provided in a seat produced according to the process of the invention for altering the inclination of the backrest relative to the seating surface. The gap between the backrest and the seating surface is relatively small and is barely noticeable to a seat user due to the cushioning pad.

In another embodiment of the invention, the inclination of the backrest relative to the seating surface can be fixed so as to be unalterable by the use of an integrally formed supporting structure. This results in a transition that is free of gaps between the backrest and the seating surface, preferably in conjunction with a cushioning pad that likewise covers both regions of the seat without interruption.

Seats that are produced using a cushion support produced according to the process of the invention can be provided with a relatively very thin cushion support and they still offer very good seating comfort since the cushion support, due to its good fit, is only required to compensate for small "deviations" from the body form of the seat user. This results in less installation space and low weight of the seat. The supporting substructure comprising the seating surface and/or backrest of the seat can be planar as far as possible or it can have a three-dimensional contour. However, the use of a supporting shell produced according to the invention as a supporting substructure is ruled out since there would hardly be any free space in such a supporting shell for a contouring of the cushion support since the cushion support would have to be of approximately even thickness over its entire surface extent due to the contouring of the supporting shell.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
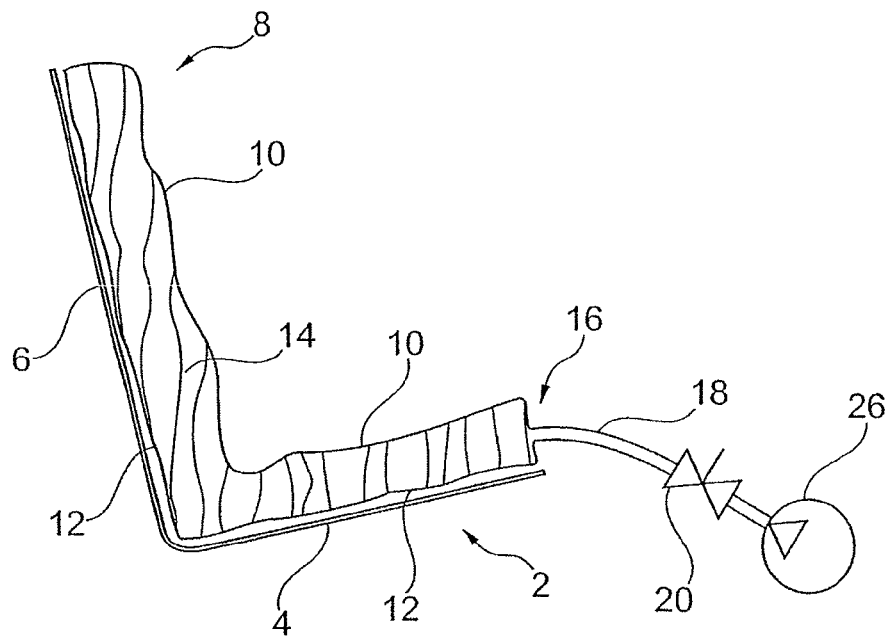
FIG. 1 is a diagrammatic side-view of a seat frame including a measuring mat in its initial state.

FIG. 1 shows a seat frame 2, also referred to as a seat mock-up, including planar, non-cushioned contact surfaces 4 and 6 for the buttocks and the back of a seat user respectively. A measuring mat 8 bears on the seat frame 2. The measuring mat 8 has an airtight jacket formed of material webs 10 and 12 disposed on its top and bottom sides respectively. At least the material web 10 disposed on the top side is made of a flexible material and it has low inherent rigidity. In the interior of the jacket, there is a filling 14 composed, for example, of a plurality of small balls with little surface roughness such that they can be displaced relative to each other with very little effort. The measuring mat 8 includes a relatively large amount of filling 14 in order to enable the flat, non-cushioned contact surfaces 4 and 6 to adapt completely to the contour of a test subject P. Thus the measuring mat 8 differs in terms of its thickness from the very thin measuring mat disclosed in DE 196 01 972 C2.

The measuring mat 8 includes a hose connection 16 and a hose 18. The volume in the interior of the measuring mat 8 can be sealed off hermetically by way of a shut-off device 20. A delivery device 26 that is, for example, in the form of a pneumatic pump, is connected to the hose 18 for generating a negative pressure and/or a positive pressure in the measuring mat 8. In the present exemplary embodiment, the fluid located in the interior of the measuring mat 8 is very easily composed of air. The measuring mat 8 can also be filled with a fluid other than air, for example, an oil-like liquid having low viscosity.

Figure 2:
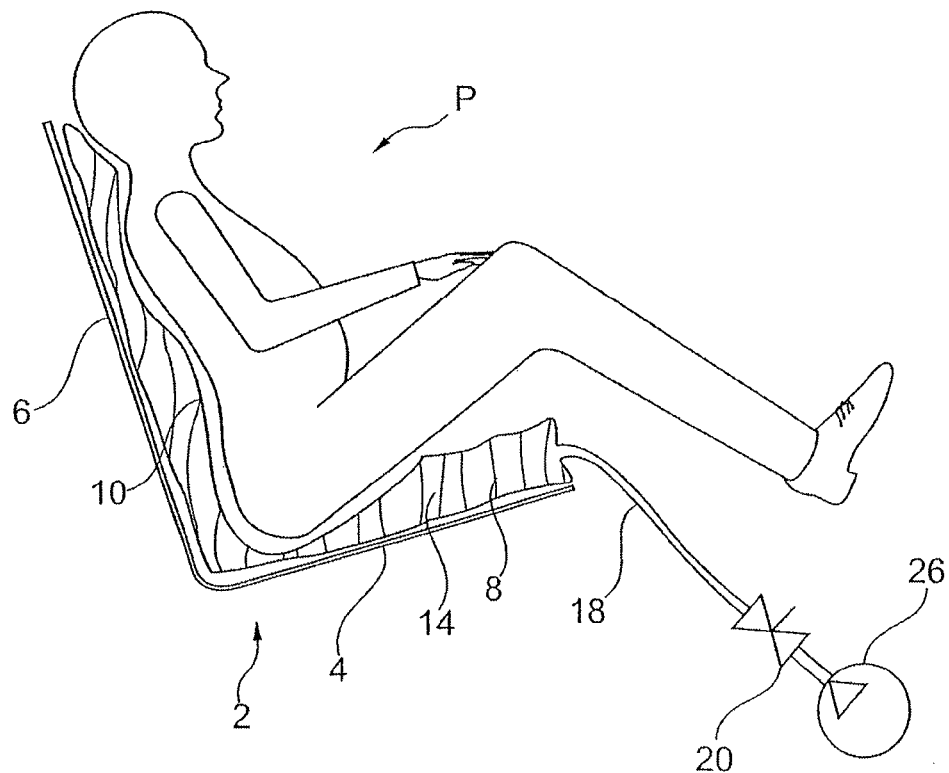
FIG. 2 is a representation that corresponds to FIG. 1 and shows the seat frame including the measuring mat, together with a test subject.

Before a test subject P sits down on the measuring mat 8 as shown in FIG. 2, the shut-off device 20 is opened so that a connection is established between the interior of the measuring mat 8 and the ambient air. In this state, the filling 14 located in the interior of the measuring mat 8 is readily displaceable, similar to a liquid having low viscosity. When the test subject P sits down, the filling 14 is displaced in the interior of the measuring mat 8 according to the contour of the body of the test subject P as a result of the contact pressure of the test subject P, a portion of the air located in the interior of the measuring mat 8 being displaced from the jacket by way of the hose line 18. The act of the test subject P sitting down on the measuring mat produces an image of the contour of the body of the test subject P on the material web 10 located on the top side of the measuring mat 8.

Figures 3, 4:
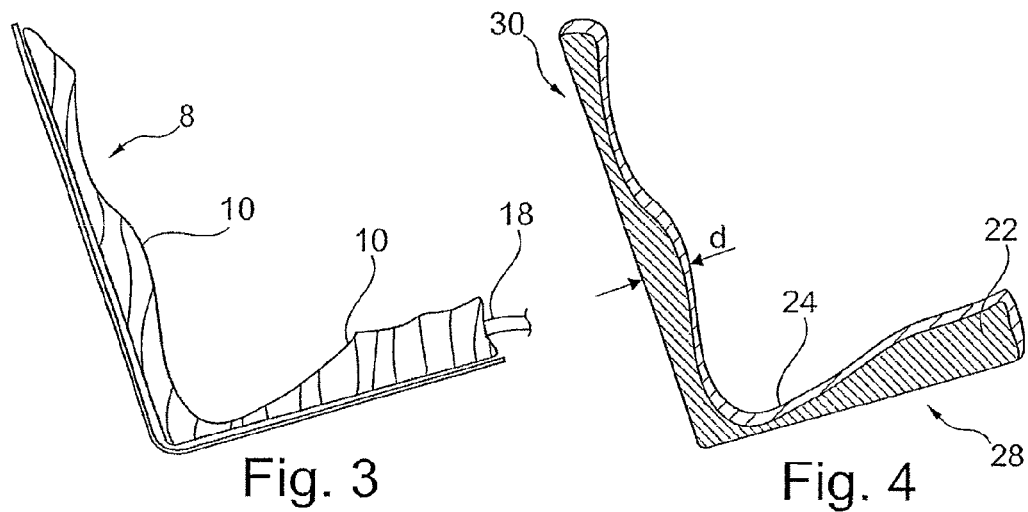
FIG. 3 is a representation corresponding to FIG. 1 after the test subject has left the seat frame that includes the measuring mat.
FIG. 4 shows a supporting shell produced according to the process of the invention.

Before the test subject P leaves the measuring mat 8, a negative pressure is generated in the interior of the measuring mat 8 by means of the delivery device 26 (switched in the form of a suction pump), and the shut-off device 20 is subsequently closed. This results in the filling 14 being fixed in place, as shown in FIG. 3. After the test subject P has left the measuring mat 8, the thus fixed contour of the material web 10 located on the top side of the measuring mat 8 is detected by means of a suitable measuring instrument. The data of the measured surface contour 40 (see FIG. 5) are stored in a computer unit.

The shut-off device 20 is now opened so that the displaced air can flow into the interior of the measuring mat 8 again. This releases the fixed state of the filling 14. This effect can be reinforced by introducing a low positive pressure by means of the delivery device 26 (switched in the form of a pressure pump) into the measuring mat 8. The filling 14 is now distributed uniformly and the measuring mat 8 is thus brought again into its initial position shown in FIG. 1 in preparation of the next "in-seat" measurement. The in-seat measurement can then be carried out with the next test subject P.

After a plurality of in-seat measurements are carried out with different test subjects P, the measured three-dimensional surface contours 40 of the deformed measuring mat 8 are averaged by superimposing the same onto each other by use of the computer, and the average surface contour of an ideal supporting structure 22 is derived therefrom that has a suitable "fit" both in the region of the seating surface 28 and the backrest 30 for all test subjects P that participated previously in the in-seat measurements. As long as the entire spectrum of possible seat users is covered by the in-seat measurements, a supporting shell 22 that adapts to all possible seat users can be provided for the seat. If the supporting shell 22 thus produced is then provided with a relatively thin cushioning pad 24, a seat that offers excellent seating comfort and that is characterized by much less total thickness d of the supporting shell 22 and the pad 24 is made available irrespective of the very thin pad 24.

Figure 5:
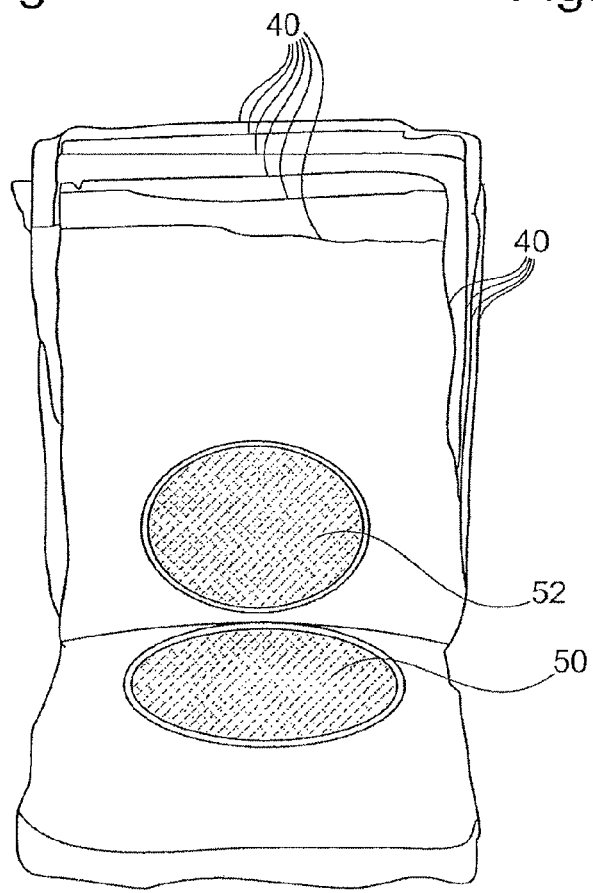
FIG. 5 is a perspective view of the superimposition of a plurality of measured surface contours onto each other.
Figure 6:
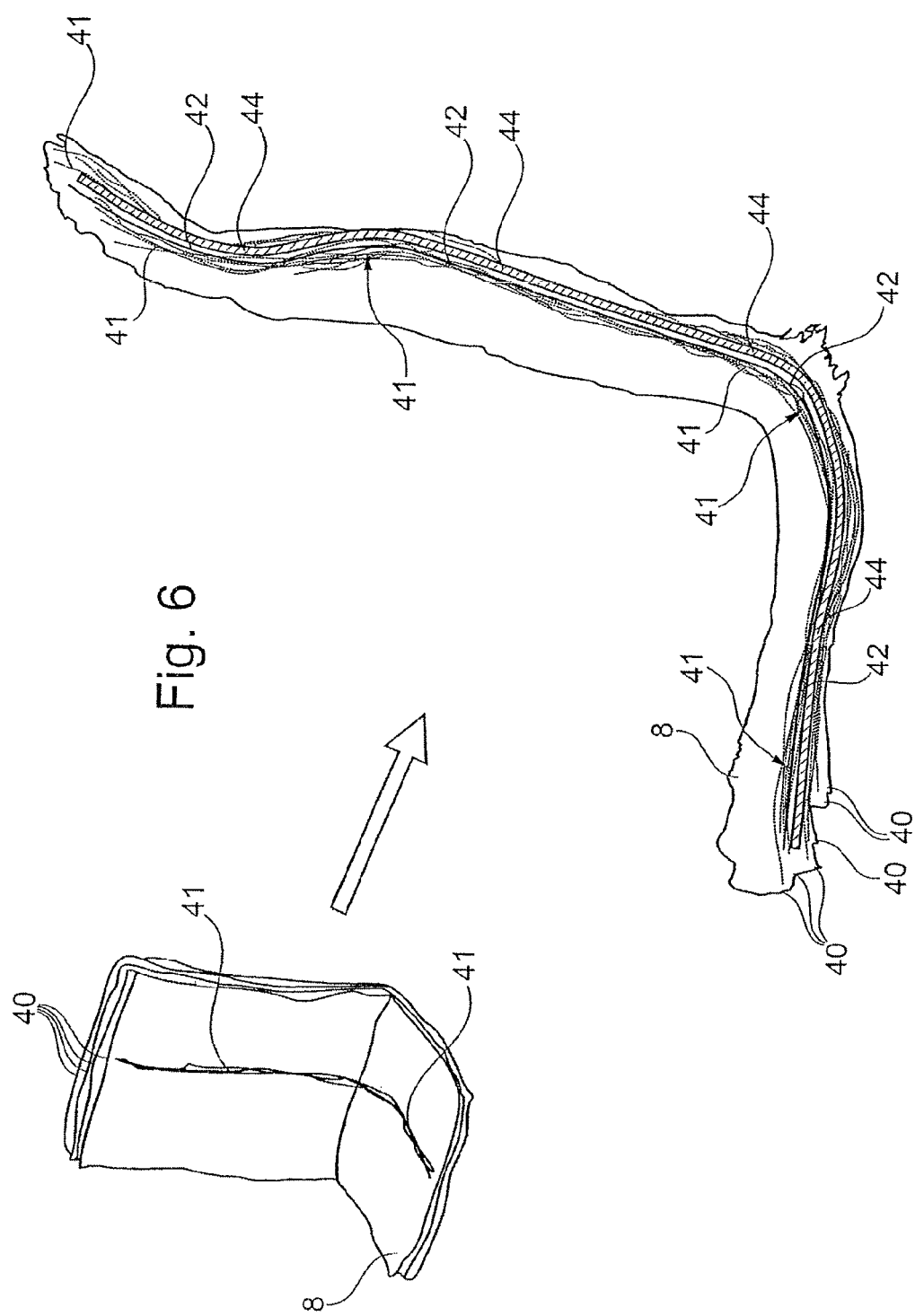
FIG. 6 is a sectional representation of the superimposed surface contours shown in FIG. 5.

FIGS. 5 and 6 show the superimposition of a plurality of measured surface contours (scans) 40 onto each other that originate from in-seat measurements carried out with approximately 30 test subjects P in the present exemplary embodiment. The individual scans 40 are represented in different shades of gray. For aligning the scans 40 for the purpose of superimposition, a region, for which a relatively small permissible centerline tolerance of the measured scans 40 is defined, is selected from the entire surface of contact with a user. The regions 50 or 52 marked in FIG. 5 are very suitable for this purpose. The region 50 represents the depression created by the buttocks of the test subject, while the region 52 corresponds to the lower section of the back.

FIG. 6 is a sectional representation of the center plane of the superimposed scans 40. The perspective representation of the superimposed scans 40 in the top left part of FIG. 6 shows the location of the center plane by, means of the cut lines 41 (shown in a light tone) of the individual scans 40. In the enlarged sectional representation of FIG. 6, these cut lines 41 are likewise represented by a plurality of light-toned lines, while the contours of the measuring mat 8 derived from the different in-seat measurements appear in dark shades of gray. The cut lines 41 are composed of a plurality of individual measuring points.

The average of the cut lines 41 (the thickness of the measuring points of the individual cut lines 41 is decisive) determined by means of the computer results in the average contour line 42 shown with a thin line thickness. This average contour line 42 is provided with an offset in the direction of "large seat user," which results in a "modified contour line" 44 (shown in increased line thickness).

Apart from the contour lines 42 and 44 shown by way of example, there is a large number of additional contour lines 42 and 44 computed in the center plane of the scans 40, when viewed in the width direction of the seat, so that the in-seat measurements and the subsequent calculations of the individual contour lines 42 result in an average three-dimensional surface contour 42 and a modified three-dimensional surface contour 44 over the entire width of the seating surface 28 and backrest 30 of the supporting shell 22.

Figure 7:
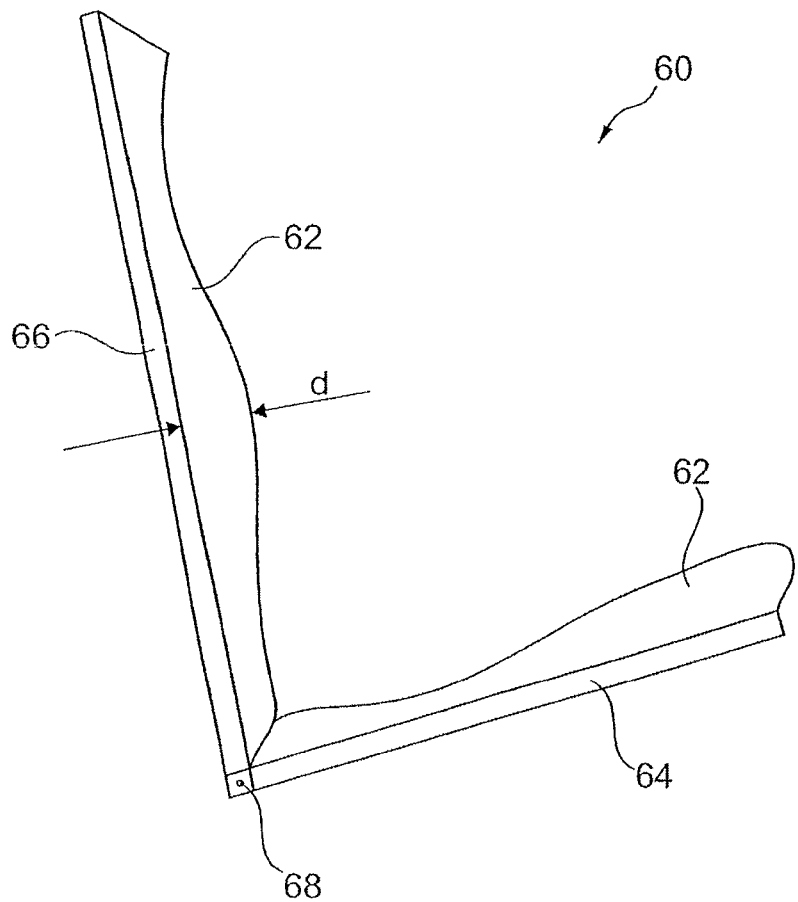
FIG. 7 shows a seat including a cushion support produced according to the process of the invention.

FIG. 7 shows a seat 60 that includes contoured cushion supports 62 on a non-contoured, or only slightly contoured, supporting substructure composed of the seating surface 64 and the backrest 66. The cushion supports 62 are produced similarly to the process described above and they are characterized by excellent fit for all possible seat users. Thus the thickness d of the cushion supports 62 can be relatively small. A swivel joint 68 is provided between the seating surface 64 and the backrest 66 for altering the inclination angle of the backrest 66 relative to the seating surface 64.

Summing up, the invention can be described as follows. The invention provides a process for producing a supporting shell 22 for a seat. In this process, in-seat measurements are carried out in a series of measurements with a plurality of test subjects P, wherein the test subjects P sit down on a measuring mat 8 placed on a neutral seat frame 2. The measuring mat 8 has a readily displaceable filling 14 and adapts to the contour of the body of the respective test subject P. After the test subject P has sat down on the measuring mat 8 and before the test subject leaves the same, the filling 14 inside the measuring mat 8 is fixed in place by applying a negative pressure. The geometric data of the surface contour 40 of the measuring mat 8 are determined and stored for each test subject P. The measured surface contours 40 are then superimposed onto one another. This produces an average surface contour 42 which can subsequently be further altered slightly for adaptation to large seat users, and therefore a modified surface contour 44 is created as a basis for the production of the supporting shell 22 of the seat. Since the surface contour 42 or 44 fits all possible seat users really well, even a relatively thin cushioning pad 24 on the supporting shell 22 is sufficient to achieve excellent seating comfort for various seat users. In addition, the invention suggests a process for producing a cushion support 62 for a seat 60 having a non-contoured or only a slightly contoured supporting substructure 64, 66 similarly to the process described above for producing a supporting shell 22.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A process for producing a supporting shell for a seat having at least one pad, which supporting shell forms a supporting substructure for at least one of a seating surface and a backrest of the seat, the process comprising the acts of:
   a) providing a measuring mat on a seat frame comprising a planar, non-cushioned contact surface in a region of the seating surface and/or backrest, the measuring mat being flexible in space;
   b) seating a test subject down on the measuring mat, and fixing in place a three-dimensional surface contour of the measuring mat produced by the act of sitting down;
   c) determining geometric data of the three-dimensional surface contour of the measuring mat;
   d) releasing the fixed three-dimensional surface contour of the measuring mat;
   e) repeating the acts of seating, determining and releasing with different test subjects; and
   f) superimposing the three-dimensional surface contours resulting from the measurements carried out with different test subjects onto each other, and deriving the three-dimensional surface contour of the supporting shell therefrom.

2. The process according to claim 1, further comprising the acts of:
   for superimposing the measured three-dimensional surface contours onto each other, determining a defined section of the contact surface of the test subjects with the seat, in which the measured three-dimensional surface contours are to be aligned to each other; and
   wherein the defined section is determined based on criterion of a least possible deviation of geometric shape and space coordinates of the measured three-dimensional surface contours from each other.

3. The process according to claim 2, wherein the defined section is one of a buttocks area and a lower back region.

4. The process according to claim 3, wherein the measured three-dimensional surface contours are superimposed onto each other in the defined section according to a best-fit process.

5. The process according to claim 1, wherein the deriving act further comprises the acts of:
   determining an arithmetic average after the superimposition of the measured three-dimensional surface contours onto each other; and
   deriving an average three-dimensional surface contour therefrom.

6. The process according to claim 5, wherein
   the average three-dimensional surface contour is expanded to result in a modified three-dimensional surface contour.

7. The process according to claim 1, wherein the seating act further comprises the act of seating the test subjects down in a posture corresponding to a sitting posture in a motor vehicle.

8. The process according to claim 7, wherein the seating act further comprises the act of requiring the test subjects, when seated, to carry out movements corresponding to customary movements performed during operation of the motor vehicle.

9. The process according to claim 1, wherein the fixing in place of the three-dimensional surface contour of the measuring mat is performed by a delivery device that exerts and maintains a negative pressure within the measuring mat, the negative pressure maintaining the contoured shape of the test subject on the measuring mat after the test subject no longer contacts the measuring mat.

10. A process for producing a cushion support for a seat, which cushion support serves as a support on a supporting substructure for at least one of a seating surface and a backrest of the seat, the process comprising the acts of:
    a) providing a measuring mat on a seat frame comprising a planar, non-cushioned contact surface in a region of the seating surface and/or backrest, the measuring mat being flexible in space;
    b) seating a test subject down on the measuring mat, and fixing in place the three-dimensional surface contour of the measuring mat produced by the act of sitting down;
    c) determining geometric data of the three-dimensional surface contour of the measuring mat;
    d) releasing the fixed three-dimensional surface contour of the measuring mat;
    e) repeating the acts of seating, determining and releasing with different test subjects; and
    f) superimposing the three-dimensional surface contours resulting from the measurements carried out with different test subjects onto each other, and deriving the three-dimensional surface contour of the cushion support therefrom.

11. The process according to claim 10, further comprising the acts of:
    for superimposing the measured three-dimensional surface contours onto each other, determining a defined section of the contact surface of the test subjects with the seat, in which the measured three-dimensional surface contours are to be aligned to each other; and
    wherein the defined section is determined based on criterion of a least possible deviation of geometric shape and space coordinates of the measured three-dimensional surface contours from each other.

12. The process according to claim 11, wherein the defined section is one of a buttocks area and a lower back region.

13. The process according to claim 12, wherein the measured three-dimensional surface contours are superimposed onto each other in the defined section according to a best-fit process.

14. The process according to claim 10, wherein the deriving act further comprises the acts of:
    determining an arithmetic average after the superimposition of the measured three-dimensional surface contours onto each other; and
    deriving an average three-dimensional surface contour therefrom.

15. The process according to claim 14, wherein the average three-dimensional surface contour is expanded to result in a modified three-dimensional surface contour.

16. The process according to claim 10, wherein the seating act further comprises the act of seating the test subjects down in a posture corresponding to a sitting posture in a motor vehicle.

17. The process according to claim 16, wherein the seating act further comprises the act of requiring the test subjects, when seated, to carry out movements corresponding to customary movements performed during operation of the motor vehicle.

18. The process according to claim 10, wherein the fixing in place of the three-dimensional surface contour of the measuring mat is performed by a delivery device that exerts and maintains a negative pressure within the measuring mat, the negative pressure maintaining the contoured shape of the test subject on the measuring mat after the test subject no longer contacts the measuring mat.

19. A seat comprising:
- a supporting shell having at least one pad, the supporting shell forming a supporting substructure for at least one of a seating surface and a backrest of the seat;
- a seat frame comprising a planar, non-cushioned contact surface in a region of the seating surface and/or backrest;
- a measuring mat disposed on the seat frame, the measuring mat being flexible in space such that substantially when a test subject sits down on the measuring mat, the measuring mat contours to a shape of the test subject that contacts the measuring map; and
- a delivery device that is structurally configured to exert and maintain a negative pressure within the measuring mat, the negative pressure maintaining the contoured shape of the test subject on the measuring mat after the test subject no longer contacts the measuring mat; wherein the seat has the at least one pad arranged on a side of the supporting shell oriented toward a seat user, wherein the pad comprises cushioning properties.

20. The seat according to claim 19, wherein the pad comprises:
- a spacer structure having layers of fabric arranged parallel to one another and joined together via spacer threads;
- a fluid-tight jacket in which is arranged the spacer structure, the jacket substantially comprising two material webs extending in parallel to one another and joined together at lateral border areas thereof; and
- at least one hose line coupled to the jacket, the hose line being operatively configured to control an amount of fluid inside the jacket.

* * * * *